United States Patent [19]
Colding et al.

[11] 4,031,368
[45] June 21, 1977

[54] ADAPTIVE CONTROL OF CUTTING MACHINING OPERATIONS

[75] Inventors: Bertil Colding, Stockholm; Arne Novak, Vallingby; Unto Sandstrom; Goran Jakobsson, both of Stockholm, all of Sweden

[73] Assignee: Verkstadsteknik AB, Stockholm, Sweden

[22] Filed: Feb. 11, 1974

[21] Appl. No.: 441,709

Related U.S. Application Data

[63] Continuation-in-part of Ser. No. 244,607, April 17, 1972, abandoned.

[52] U.S. Cl. .................. 235/151.11; 235/150.1; 235/151.32; 82/1 C
[51] Int. Cl.² .................. B23Q 15/00; G05B 13/02; G06F 15/46
[58] Field of Search .................. 235/151.11

[56] References Cited
UNITED STATES PATENTS 3,784,798   1/1974   Beadle et al. .................. 235/151.11

FOREIGN PATENTS OR APPLICATIONS 354,218   6/1973   Sweden .................. 235/151.11

*Primary Examiner*—Eugene G. Botz
*Attorney, Agent, or Firm*—Pollock, Vande Sande & Priddy

[57] ABSTRACT

For adaptive control of cutting machining operations, measured quantities characterizing optimized productivity are utilized. These quantities are connected with the wear of the tool and with the wearing rate. To measure the wear, the face wear (also called crater wear) of the tool, its flank wear and its minor-flank wear are used. Other parameters used are: the dimensions of the workpiece, its vibrations, its deflection, its surface roughness, cutting force, and cutting power. In a calculating unit, the shortest time is calculated until a given wearing criterium is reached. This time, and cost constants for the machining process, are fed into a control unit for calculating the optimized (maximum) productivity, and for performing the machining operation with cutting parameters kept within predetermined values. Machining is interrupted for tool changing when one of said wearing criteria is reached.

28 Claims, 23 Drawing Figures

ADAPTIVE SYSTEM FOR NC LATHE

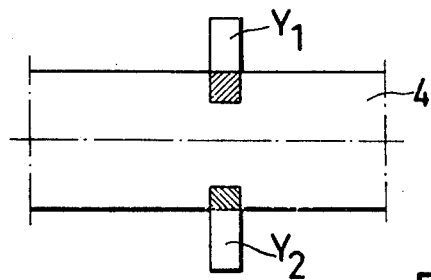
FIG. 6
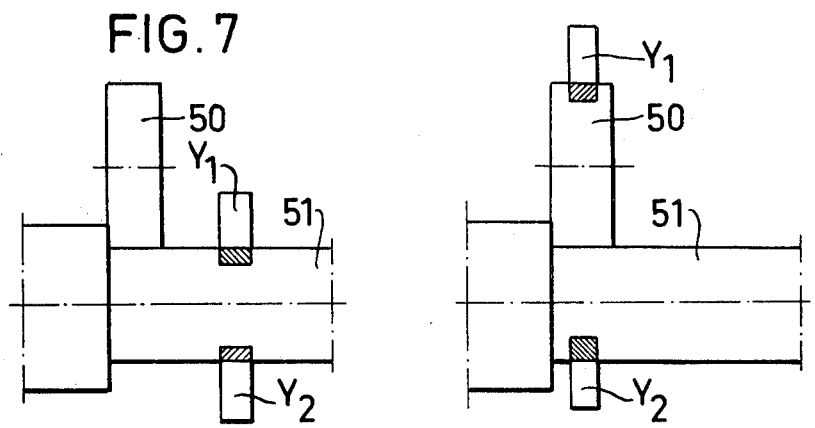
FIG. 7
FIG. 8
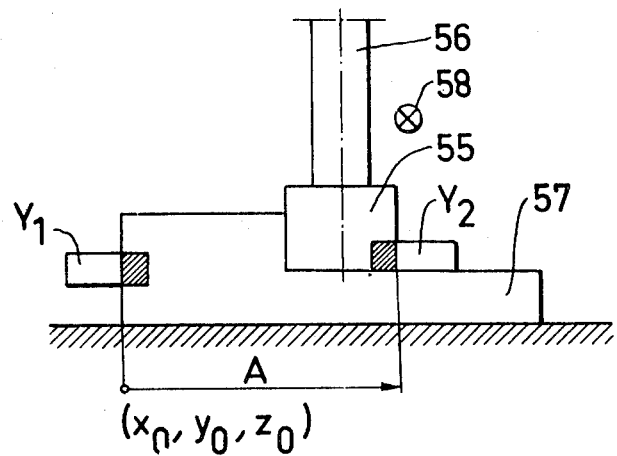
FIG. 9

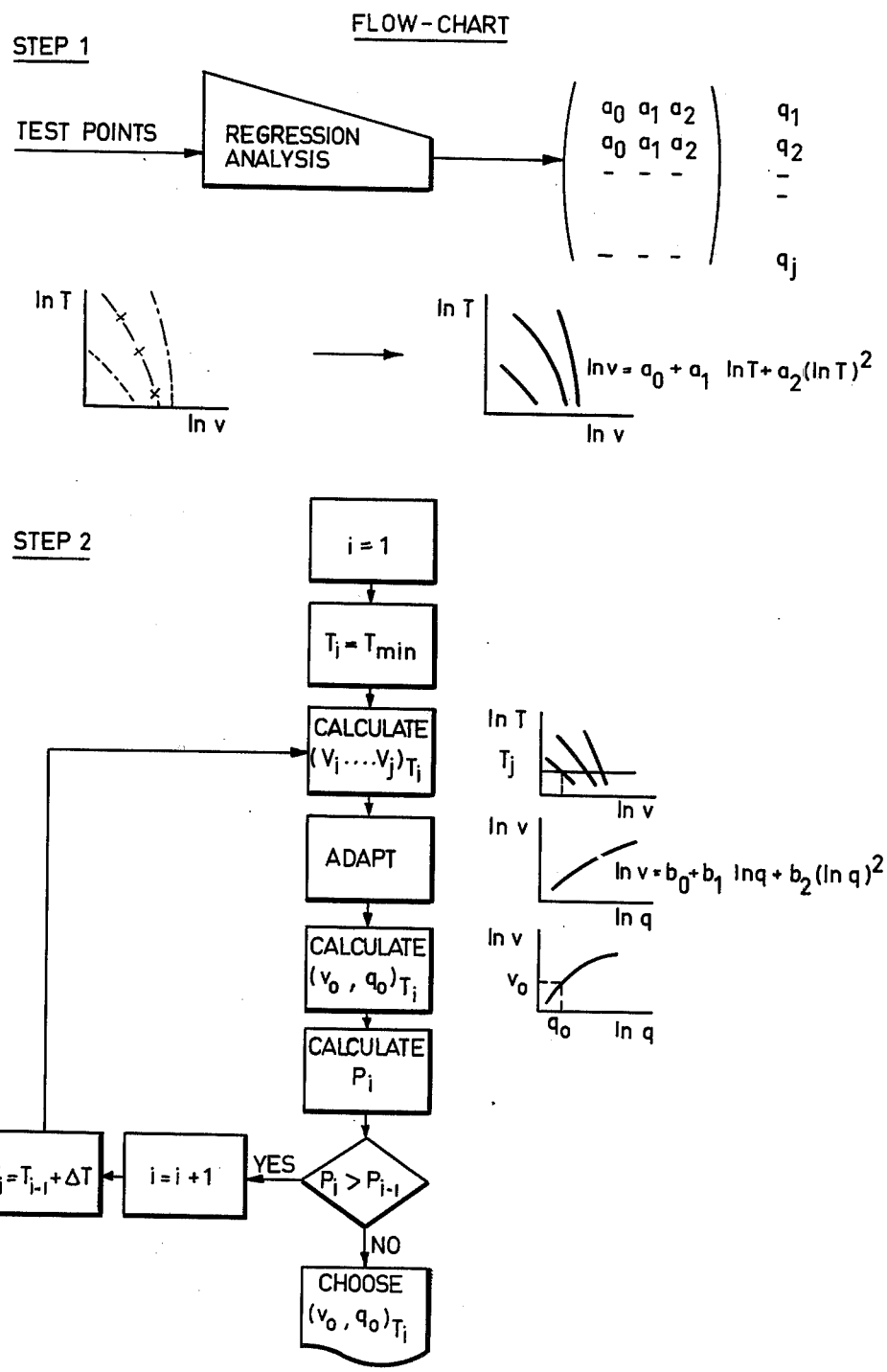

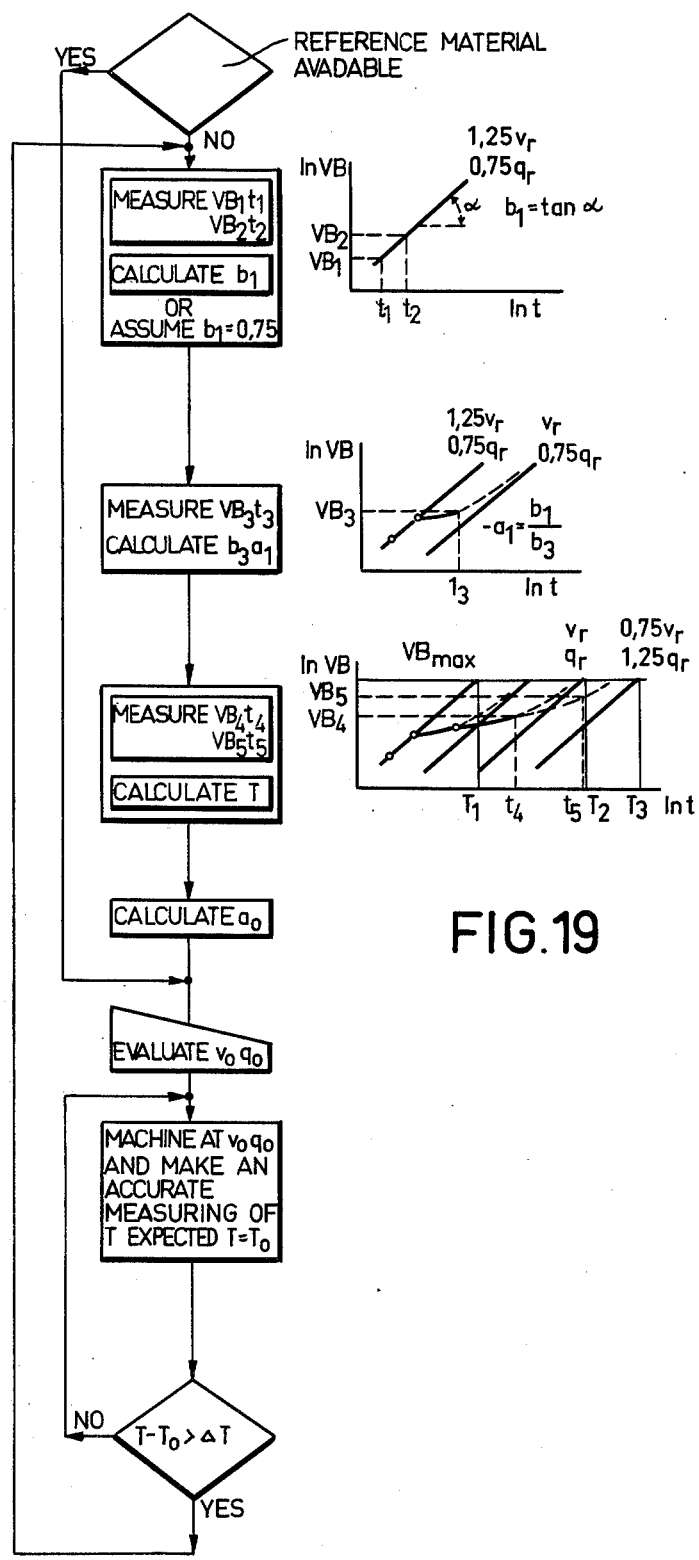

ADAPTIVE SYSTEM FOR NC LATHE

CORRECTION CURVE FOR THE LASER ROUGHNESS INSTRUMENT. THE MEASURING POINTS FALL WITH 80% PROBABILITY WITHIN THE ±30% LINES.

ADAPTIVE CONTROL OF CUTTING MACHINING OPERATIONS

This application is a continuation-in-part of our copending application, and now abandoned Ser. No. 244,607, filed Apr. 17, 1972 by the present inventors.

BACKGROUND OF THE INVENTION

The present invention relates to a method and a device for adaptive control of cutting machining operations by using quantities measured during the machining and characteristic of the productivity optimizing of the machining operation.

The object of the adaptive control intended by the invention is to maximize productivity. In cutting machining operations, which are the main object of the present invention, the productivity can be expressed as the inverted value of the cost per volume unit of machined material. When so defining the productivity, it is understood that a desired exactness of dimensions must be achieved and that the machined surface must not be inferior to what is desired. Moreover, it is understood that the machining is performed in a given machine with given tools and that the upper limits of force, power, moment and cutting velocity demanded by the combination machine-tool-working piece must not be exceeded. Thus, for adaptive control, a limited number of independent variables are available, and the productivity is regarded as a function of only these independent variables.

In order to describe the method of adaptive control in stock removal, a turning operation, in a numerically controlled machine is chosen. When turning, one has, in the simplest case, to work with only two independent variables, viz, feeding and cutting speed. In more sophisticated systems, a third independent variable may be introduced for instance, the cutting depth.

In stock removal, the tool is worn and after a certain time T it is worn-out and must be replaced. The cost of the tool and the time for replacing the tool must be considered. The wearing time T is therefore of considerable importance to the productivity. According to Colding [e.g. Annals of the C.I.R.P. (International College for Production Engineering Research), volume 17, 1969, pages 279–288], the productivity can be expressed as $$p = \frac{V}{q} \cdot \frac{T}{T + T_v}$$

where V = cutting speed, q = chip equivalent (incorporating, in a single parameter a plurality of cutting parameters), T = tool-life and $T_v$ = tool cost (including the costs associated with tool changin, and other related factors affecting tool costs), all converted into machine time. It is, of course, well-known in the art that the chip equivalent concept is applicable not only to turning operations but also to milling and grinding. Thus, chip equivalent may be expressed by the formula $q = L/(T.S)$ where L is the whole cutting edge length, $t$ is the cutting depth, and S is the feed rate. As is known in the art, however, chip equivalent may also be expressed in a more general way by the formula $q = L/A$, where L equals the engaged cutting edge length and A equals the cross-sectional area of the underformed chip.

What has so far been said has been known for a long time and many efforts have been made to calculate in advance the tool-life T in order to make possible calculations of cutting values giving maximum productivity. Taylor3 s equation $V (T\alpha)$ = constant, where V is the cutting speed and $\alpha$ is a material constant, is also known. This equation, however, has a limited range of validity, which has been shown by Colding among others. Furthermore, it does not consider feed rate, cutting depth or chip equivalent, which quantities have a great influence on tool-life.

From a general point of view, it can be said that all calculations to predict tool-life T give very uncertain results, if one does not check during the machining, that the conditions of the calculations are valid.

In adaptive control, T can be calculated with a greater exactness by continuous or intermittent measurement during machining of quantities having decisive importance on T.

In the literature, several attempts at calculating T by using formulas containing measured cutting forces, powers and cutting edge temperatures are reported. The results, however, have been negative from a general point of view.

SUMMARY OF THE INVENTION

According to the invention, we measure instead, the wear itself and the wear rate, and T is calculated by means of a formula as will be illustrated hereinafter. The invention is characterized in that quantities are measured corresponding to at least one of the following wear parameters: the crater wear (also called face wear) of the cutting tool, its flank wear, its minor-flank wear, and the following parameters: the dimensions of the machined work piece, its vibrations, its deflection, and its surface roughness. Moreover, the cutting forces and the cutting power used are measured, after which the wear parameters together with suitable wear criteria and constants are fed into a calculating unit representing a mathematical model of the machine process, and the shortest time T is calculated until one of the following wear criteria is achieved, starting from an unworn cutting edge: a predetermined crater volume, a predetermined crater angle, a predetermined flank wear width, and/or a predetermined minor-flank wear. This time T, and cost constants valid for the machining process, are used in order to calculate in a control unit the productivity that can be achieved with the cutting data used in the machining process, in addition to which these data are varied until the productivity reaches a maximum value, considering that the range of variation of cutting data is limited to such ranges where the measured values of the dimensions, vibrations, deflection and surface roughness as well as cutting forces and cutting power of the workpiece are within predetermined values, and that machining is interrupted for tool changing, when one of said wear criteria is reached.

Thus the invention uses the knowledge that in stock removal substantially two types of wear, viz. flank wear and crater wear (face wear), can be distinguished. The flank wear gives, as a negative result, that feeding forces and the risk of vibrations increase and that a change of the edge position is obtained, which gives erroneous dimensions of the workpiece. As a wear criterion, usually a flank wear width is used, which is based on experience. The crater wear gives as a result that the edge becomes sharper and finally breaks. As wear criterion, certain crater dimensions are used, for instance crater angle, crater volume, crater depth and crater width. Sometimes a heavy wear of the minor-flank may occur, which makes the surface roughness of the workpiece unacceptable. Some of the types of wear may predominate, i.e. due to the material of the workpiece and the tool and of working data, but in certain cases all types can occur simultaneously. One advantage of the method of the present invention is therefore that all these types of wear are considered and that among the different types of wear, the wear that is most limiting for the tool life is used. Therefore, when calculating the expected tool life, several types of wear measured together with wearing criteria based on experience and suitable calculating formulas, are used. To determine tool-life T in the productivity formula, the shortest one of the calculated times is used. By means of the calculated tool-life T and the productivity formula, the productivity is calculated. The independent variables, for instance the feed rate $s$ and the cutting speed $V$, are then varied until a higher productivity cannot be reached.

It is also with this sophisticated system possible to make erroneous calculations. This can be compared to a system where one has obtained an erroneous level chart of the productivity as a function of the independent variables. Therefore, the possible productivity for the cutting data chosen can be higher than the calculated one. However, by using the invention, this higher productivity can be obtained with the same cutting data. This is effected by means of a continuous control of the negative effects of the wear and continued machining until these become too great. The negative effects are mainly dimensional errors, vibrations and deteriorated surface of the workpiece and an increased risk of edge damage of the tool. The risk of edge damage is calculated by measuring the crater wear. Dimensions, vibrations and surface smoothness of the workpiece are controlled by means of an optical measuring system based on the use of laser light and photo detectors according to a system which will be described more in detail in the following.

The adaptive control system of the invention is thus characterized in that the tool life is calculated with separate consideration of the normal formulas of wear, and continuation of the machining until the effects of the wear become unacceptable, and further by controlling the machining operation so as to maintain within predetermined constants the vibration and deflection of the workpiece.

The invention also affords a solution of the measuring problems connected with the adaptive system described, in using devices which allow remote measuring. Electromagnetic radiation, for instance of the laser type, is used, which is emitted towards the measuring places of the workpiece and the tool. Laser light is very suitable, as the radiation used should be of coherent, parallel, monochromatic, highly intensive kind, and such a light can be obtained from a laser. Detectors are arranged to respond to the radiation from the laser subject to the effect therein of the tool and/or the workpiece

BRIEF DESCRIPTION OF THE DRAWINGS

The measuring technical devices required for realizing the invention will be explained in detail with reference to the attached drawings with their FIGS. 1 to 23.

FIG. 6 shows a measuring place for dimension control in turning.

FIGS. 7 and 8 show different methods of arranging measuring places in grinding.

FIG. 9 shows a method of arranging a measuring place in milling.

FIG. 17 illustrates a flow-chart of calculating processes involved in a typical optimization procedure.

FIG. 19 illustrates a flow-chart for testing material properties.

DETAILED DESCRIPTION OF THE PREFERRED EMBODIMENTS

Figure 1:
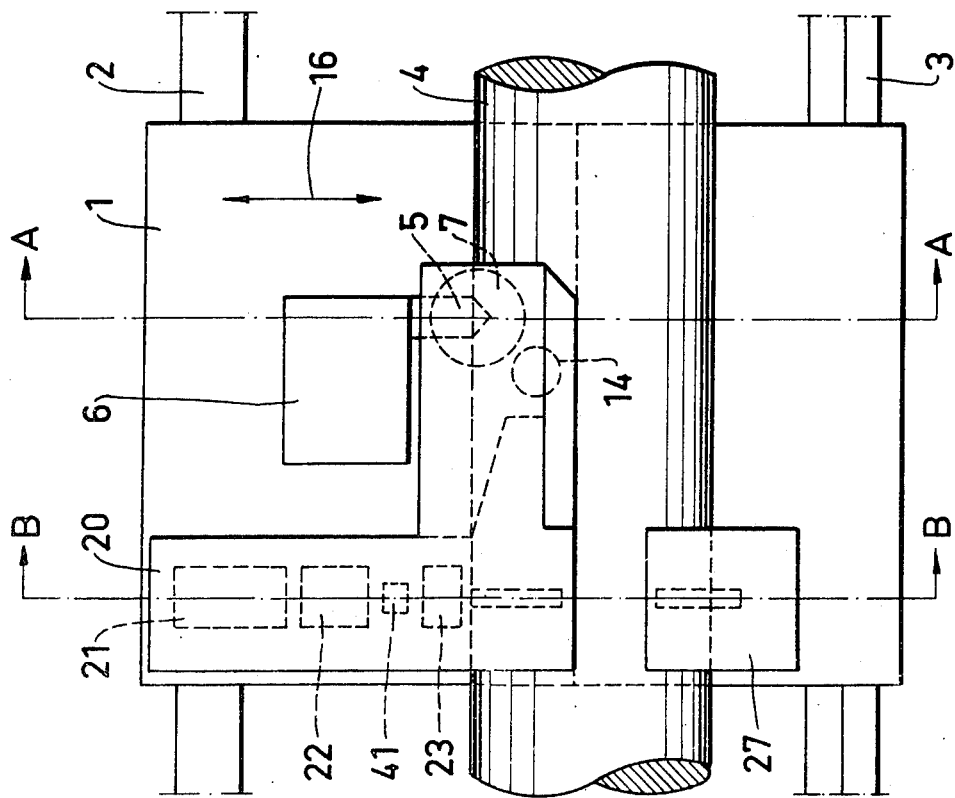
FIGS. 1 to 3 show the orientation of the laser optical system for the adaptive control of a lathe.
Figure 2:
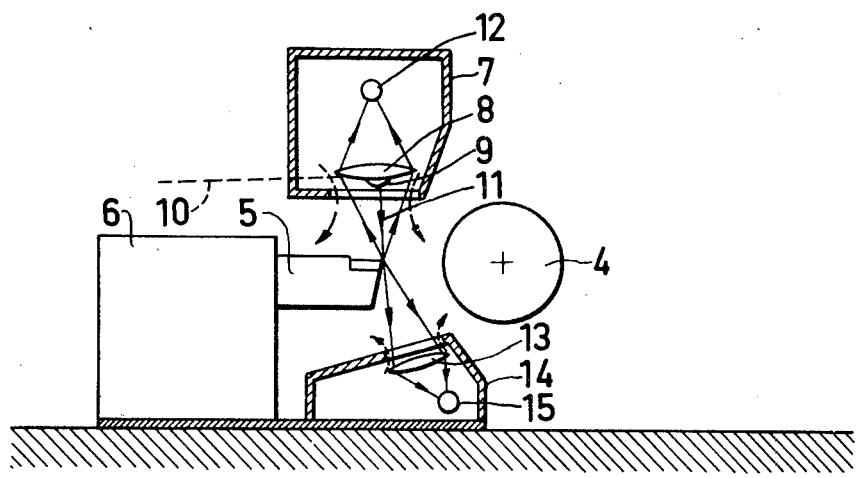
Figure 3:
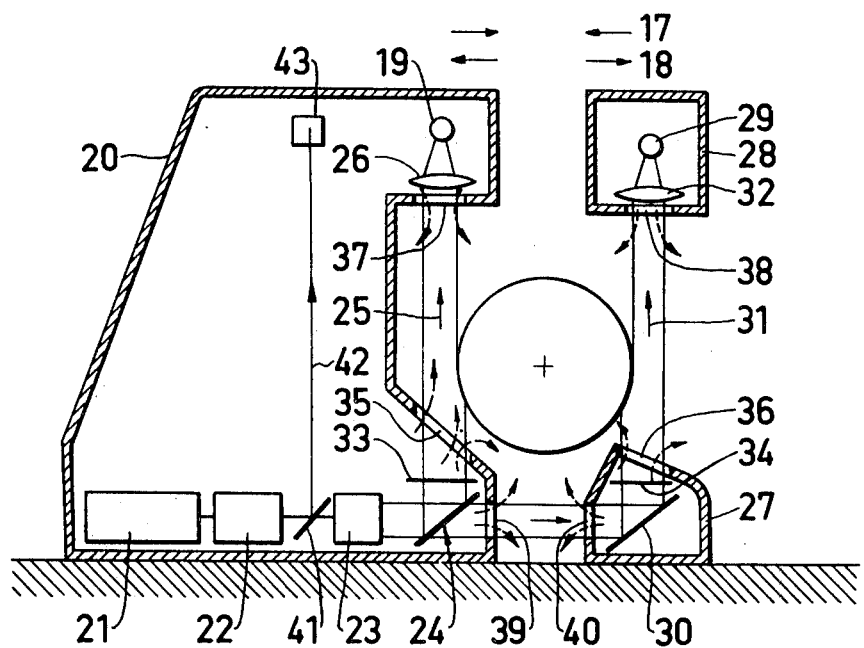
Figure 4:
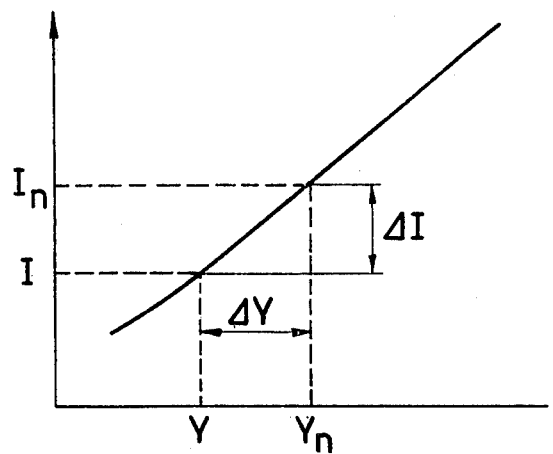
FIG. 4 shows a diagram of the intensity of the radiation as a function of the area of the beam of rays.

FIGS. 1 to 3, the schematic arrangement of the orientation of the laser optical system of a lathe for obtaining measuring values necessary for the adaptive control of the machining process is shown. The laser optical system for measurement of diameter, vibration and deflection, and a measuring place for flank and crater detection of the lathe tool are shown. By feeding these measuring values into a control system, the adaptive control is made possible. A lathe is provided with a cross slide 1 governed by two guideways 2 and 3. In the machine there is a workpiece 4, which is machined by a lathe tool 5 mounted in a tool holder 6, which is attached to the cross slide. In FIG. 1, two sections 2—2 and 3—3 are shown, of which the former refers to FIG. 2 with the place of control for flank and crater detection of the lathe tool, and the latter to FIG. 3 with the location of control for diameter measure, deflection and vibration of the workpiece.

The measuring place for control of the wear of the lathe tool is arranged in a stationary position relative to the retracted lathe tool, for instance before it is brought forward for starting a new cut. The equipment at the measuring place consists of an upper cap 7 containing a lens 8 having on its under side an inclined reflector 9 for reflecting a laser beam to the measuring place. This laser beam is reflected according to the arrow 11 against the edge of the lathe tool 5, where it is used for crater detection, in that beams reflected from the crater of the lathe tool impinge upon the lens 8 and refracted towards a detector 12. The laser beam 11 also impinges upon the flank of the lathe tool and is directed against a lens 13 arranged under the lathe tool. This lens is covered by a cap 14. The beams are refracted towards a detector 15 by this lens. Output signals from the detectors 12 and 15 are used for determining the wear of the lathe tool and for the adaptive control of the turning process, when the lathe tool has again been brought to the working position. Retraction of the tool into a measuring position need only be effected a short distance and the measuring can be made in a very short time.

In order that chips, dust and cutting fluid will not disturb the measurements, the caps are provided with a device for compressed-air blowing according to the dashed, bent arrows, in addition to which also compressed-air is blown against the edge of the lathe tool, when this has entered the measuring position, which may for instance be 10 mm from the workpiece. The motion of the lathe tool is marked in FIG. 1 with a double arrow 16.

At a distance of, for instance, 50 mm behind the chip cutting location, i.e. the working zone, the measuring place for diameter measuring is arranged. This place, FIG. 3, comprises two detector systems, one on each side of the workpiece 4, which are mutually mechanically guided and move according to the arrow pairs 17 or 18. According to the selected illustrative example, one detector 19 is mounted in a casing 20 containing a laser 21, a polarisation modulator 22, for instance an apparatus for rotating the polarisation plane, and beam forming means 23. In the latter, the laser beam is given a rectangular cross sectional form, for instance with the dimensions $0.5 \times 2$ mm$^2$. By means of a semitransparent reflector 24, a part of the rectangular laser beam according to the arrow 25 is directed toward a lens 26 or the like refracting the beam towards the detector 19. The other part of the rectangular laser beam passes out through the casing 20 and into a cap 27, which is joined to another cap 28 containing the other detector 29. Can 27 contains a reflector 30 which, according to the arrow 31, directs the laser beam towards a lens 32, refracting it towards the detector 29. In the vicinity of the two reflectors 24 and 30 there are two polarizers 33 and 34, which act upon the laser beams before these leave through apertures 35, 36 in the caps 20, 27 to impinge upon the workpiece 4. Other apertures 37, 38 are situated near the lenses 26 and 32. All the apertures 35, 36, 37 and 38 and the apertures 39, 30 for the beam path between the casing 20 and the cap 27 are provided with means for blowing out compressed-air for cleaning the beam path.

The two beams of laser light according to the arrows 25 and 31 are so adjusted with respect to the workpiece 4 that this partly screens the beams. The measuring method is built on the principle that the two non-screened parts of the two beams of laserlight are detected and together give an output signal which is independent of the location of the workpiece within the two rectangular beams. By combining in a suitable manner the output signals from the detectors used in the analyzer, it is thus possible, according to the invention, to measure the cross-sectional dimensions of an object, its out-of-roundness, eccentricity deflection, and vibration. The cross-sectional measuring is then independent of the other factors.

In the embodiment shown, it is assumed that only one laser 21 is used for both measuring places. The transfer of light from the laser to the measuring place at the cutting zone is effected by means of a semitransparent mirror 41 between the polarisation modulator 22 and the beam forming device 23. By means of a reflector 43, the deflected beam 42 is aimed in the direction 10 according to FIG. 2 against the reflector 9 at the lens 8.

In spite of the fact that rectangular laser beams have been treated in the above, it is not necessary that such a form be used. A round, oval or other form can also be used. FIGS. 1 and 3 do not show the mechanical connection means, i.e. partly right-hand and partly left-hand screw means, which are used for moving apart and together the two measuring places for the diameter control. In the embodiment shown, it is assumed that only one laser 21 is used for both measuring places. Of course, one laser could, however, be arranged for directing light to the workpiece measuring place and another laser be arranged for directing light to the cutting tool measuring place. Alternatively, when using an embodiment as shown, it is quite obvious for one skilled in the art to take away the mirror 41, so that all light from the laser 21 will be directed to the workpiece measuring place, or to substitute the mirror 41 with a total reflecting mirror, so that the light from the laser 21 only will be directed to the cutting tool measuring place, or to substitute the semi-transparent mirror 41 with a means directing light to either or both of the measuring places, or in one way or another screen the laser beam 42 or the beam to the beam forming means 23.

Thus, it is within the scope of the invention either to measure on the cutting tool or to measure on the workpiece as well as measure on both the cutting tool and the workpiece. In the latter case, the measurement can be performed simultaneously.

The suggested measuring equipment requires an exactness in positioning of between $\pm 0.02$ and $\pm 0.002$ mm. The cutting tools can be preset without difficulty to this exactness in modern machining devices or fixtures. The stability of machine tools varies in practice and depends on the shape of the workpiece, and this must also be considered in measuring.

Figure 5:
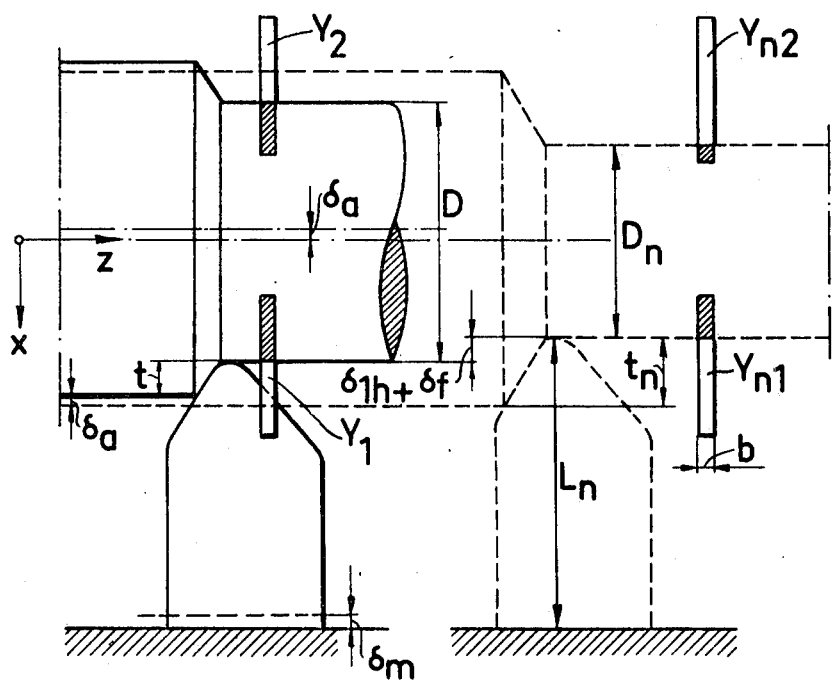
FIG. 5 shows a workpiece during turning with designations pertinent to the machining.

When the measuring of dimensions for adaptive control is applied according to the invention, a zero ($x_0$, $y_0$, $z_0$) is required. One point of the cutting edge of a lathe tool is thus always fixed with respect to this zero, and the degree of positioning exactness indicated above must be satisfied. If FIG. 5 is considered, the surfaces $Y_1$ and $Y_2$ must thus be adjusted with respect to the diameter D of the workpiece. For each nominal diameter $D_n$ of the workpiece, an intensity $I_n$ of the preferably rectangular laser beams is obtained corresponding to the surfaces $Y_{n1}$ and $Y_{n2}$. The cutting depth is nominally $t_n$ and the tool has the dashed line position indicated to the right when turning a fictitious workpiece (shown with dashed lines). During the machining, substantially four different errors occur in the radial direction:

$\delta_m$ = compression of tool plus change of position in holder bracket and machine part,
$\delta_a$ = deflection of workpiece including play,
$\delta_{1h}$ = setting error of tool edge,
$\delta_f$ = wear of cutting edge.

If the real cutting depth is t and the diameter is D, the non-screened areas are $Y_1$ and $Y_2$, corresponding to the intensities $I_1$ and $I_2$. The sum $I = I_1 + I_2$ is measured. If the width of the rectangle is b the following equations are obtained $$t_n = t + \delta_m + \delta_a + \delta_{1h} + \delta_f \quad (1)$$
$$D/2 = \tfrac{1}{2} D + \delta_m + \delta_a + \delta_{1h} + \delta_f \quad (2)$$
$$\Delta Y + b(D-D_n) \quad (3)$$
$$\Delta I + k \cdot \Delta Y \quad (4)$$

The equations (3) and (4) give
$$\Delta I = k\, b\, (D - D_n) \quad (5)$$

The equations (1) and (2) give
$$t_n - t = \tfrac{1}{2}(D - D_n) \quad (6)$$

and the equations (5) and (6) give
$$\Delta I = 2\, k\, b\, (t_n - t) \quad (7)$$

The value I should thus be continuously recorded in order that impulses for the correction to nominal diameter $D_n$ and to nominal cutting depth $t_n$ shall be obtained. Thus, the method will be independent of the kind of the indicated errors.

In FIGS. 6 to 11, examples of the location of the measuring places when using different cutting tools are given. In FIG. 6a workpiece 4 and two rectangular laser beams with the non-screened areas $Y_1$ and $Y_2$ are shown in principle. Continuous vibration measuring can be carried out by measuring the variation in, for example the quantity $Y_2$.

When grinding according to FIGS. 7 or 8, where circular as well as plunge grinding may be concerned, a grinding disc 50 is adapted to a workpiece 51. Laser beams may either, according to FIG. 7 embrace the workpiece so that two non-screened parts $Y_1$ and $Y_2$ are obtained, or according to FIG. 8 so that the laser beams embrace the grinding disc and the workpiece. The methods admit continuous measuring of cross measures from information about $Y_1 + Y_2$. The wear can be measured by means of the same equipment as indicated in FIGS. 1 to 3, i.e.

a. as change of diameter b. as feeding, equal to the radial wear $\Delta r$ of the grinding disc, which is indicated by measuring the change of diameter of the workpiece, c. when $\Delta r$ reaches a predetermined value $\Delta r_o$, when information has been received that the grinding disc is to be sharpened.

Continuous measuring of vibrations can be carried out by measuring the variation in, for example, the quantity $Y_2$.

In FIG. 9 the procedure at shank-end or end plane milling is schematically shown. A milling tool 55 is driven by a shaft 56 and machines a workpiece 57 in the direction 58, i.e. perpendicular to the plane of the paper. Two laser beams with rectangular form are according to FIG. 9 adapted to be partly screened by the tool so that the non-screened area $Y_2$ is obtained. From a zero ($x_0$, $y_0$, $z_0$), a length A is set off to the far periphery of the cutting tool. The change $\Delta A$ of this distance is measured. The method admits continuous measuring of crossmeasures from information about the quantity $Y_1 + Y_2$. Wear can be measured with the method according to FIG. 2 for flank measuring in certain z-positions. Vibration measuring can be carried out continuously from information about the variation of the quantity $Y_2$.

Figure 10:
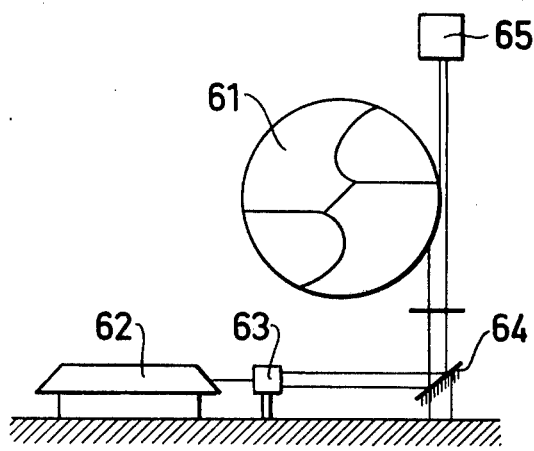
FIGS. 10 and 11 show a measuring place for control of a drilling process.
Figure 11:
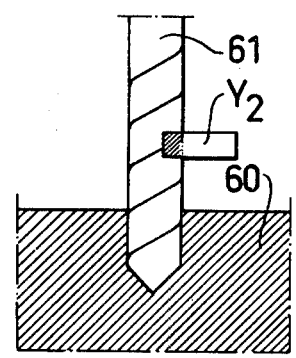

When using a drilling machine, the method of the invention according to FIGS. 10 and 11 may also be used. If a workpiece 60 is machined with a drill 61, a laser 62 emits a beam to a polarisation modular and a beam forming device 63, from which a rectangular laser beam is received, which is directed against the periphery of the drill 61 by a reflector 64 so that the beam is partly screened. The non-screened part of the beam $Y_2$ is picked up by a detector 65.

The method admits measuring of the deflection of the drill and the drilling machine. When the deflection exceeds a certain value, feeding should be reduced, as otherwise the drill will become oblique, thereby causing the hole to become oblique or the drill break as the wear becomes too large. By measuring according to the invention, quantities can be obtained which can be fed into a control system to eliminate the above risks. Wear of the drill can be measured either with the principle for dimension measurement or the method for flank measurement according to FIG. 2. Vibrations can continuously be measured from information about the variations of the quantity $Y_2$. Inputs responsive to deflection and vibration are used by the adaptive control equipment to determine maximum magnitude of the feed rate.

Dimensional measurements can be made not only of solid objects, but also of a liquid material such a stream of liquid iron.

The described method of remote, (e.g. in this case, without bodily contact) measuring of wear of a cutting edge directly in a machine tool has great advantages, and by a suitable arrangement of the detectors, flank wear as well as crater wear can be measured.

If an undulating motion with a known form of the wave front and with a known distribution of intensity is caused to impinge upon a surface, the front shape and distribution of intensity of the reflecting wave will depend on the properties of the incident undulating motion and on the shape of the reflecting surface. The difference between the incident and the reflecting undulating motion will then contain all information about the nature of the surface.

From an optical point of view, a surface may be regarded as composed of a bright surface of macro-shape and a plane surface of micro-shape, of which the latter is regarded as diffusely reflecting. The ratio between the reflection capability of the two components must be known, and further the absolute value of one of them. With these assumptions, the laws of geometrical optics can be used in order that the macro-shape of the reflecting surface might be decided by means of the measurements of the reflecting radiation.

The meaning of the conceptions macro-form and micro-form can be geometrically related to the surface and to the undulating motion, as undulating motions of a lower frequency are less influenced by small obstacles. By this, the frequency of the undulating motion can to a certain degree be adapted to the quantities desired to be indicated.

Figure 12:
FIGS. 12 to 15 refer generally to the examination of the form of a surface by means of electromagnetic radiation and show different wave fronts.
Figure 13:
Figure 14:

In accordance with the invention, laser light is used as the known undulating motion, as it is easy to establish the shape of the wave front and the intensity distribution. In this way, FIG. 12 illustrates schematically such a wave front. In order to separate this known undulating motion from other detectable undulting motions, the former is preferably modulated so that the reflected undulated motion can be separated after filtration in the detector equipment. After an undulating motion of the type as indicated in FIG. 12 has hit the intended surface, the reflected undulated motion from a known range is picked up, e.g., by means of a fixed lens, and transmitted to a detector. The difference between the incident wave front (FIG. 12) and the reflected wave front (FIG. 13) which has undergone deformation, is obtained at the detector and may be electronically evaluated to a significant information (FIG. 14).

The design of the detector can be varied depending on the amount of information desired for the surface. In the simplest embodiment, the total light intensity over the known range is measured. When a larger amount of information is desired, the distribution of intensity is measured over the known range. It is then possible either to measure over the whole range and, after data processing, to have the topography of the surface over the lit up part evaluated, or otherwise one measures over a smaller part of the range, e.g. along a circular line, and then receives less significant information about the shape of the surface. This may, however, be sufficient in certain cases, when only certain characteristic signals are utilized.

Figure 15:
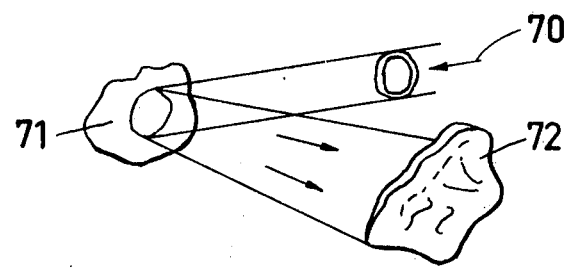

In FIG. 15 it is shown how a wave from a laser is propagated in a direction according to the arrow 70 towards a surface 71. The incident wave front is plane. A deformed wave front 72 is obtained after reflection against the surface.

Figure 16:
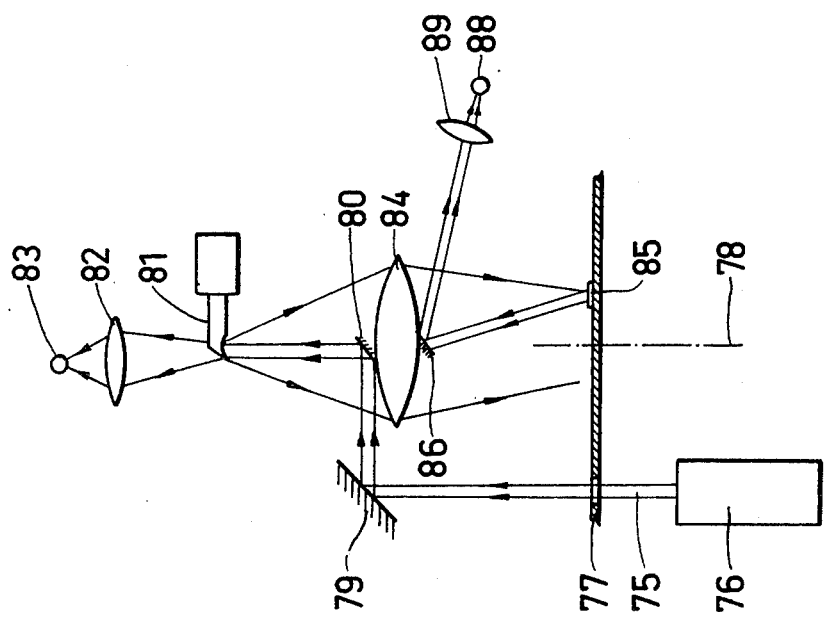
FIG. 16 shows schematically the use of the latter principle when examining the crater and the flank wear of a lathe tool.

In FIG. 16 a device is shown, which illustrates the principle used, and which corresponds to the device according to FIG. 2. A laser beam 75 having a relatively large diameter (about 3 mm) is emitted from a laser and is chopped in a rotating chopper 77 provided with apertures and with the center line 78. The beam modulated in this way via reflectors 79 and 80 is directed towards a cutting edge 81. A certain part of the beam will then be reflected by the flank of the edge, which gives a reflection collected by a lens 82 and directed to a detector 83. The total intensity of this beam is then measured. Another part of the beam is reflected by the crater in the edge. This reflected beam is collected by a lens 84. In the illustrative example shown, the beam from the lens 84 is directed towards a rotating reflector 85, which for the sake of simplicity has been shown as adapted to the disc 77. From the reflector 85 the beam is passed to a small reflector 86, which is attached at the centre line of the surface of the lens 84 and which directs the beam towards a detector 88, possibly via another lens 89. Also the reflector 80 may be attached to the lens 84. Instead of a rotating reflector 85, a stationary reflector or a beam path directly to a detector can of course be used.

Adaptive control used for optimizing of machining process makes it possible to hold the quality of machining on the best possible level when the productivity function is used as a measurement tool and material properties and even changes under the process are respected. Practically, it means that cutting variables must be measured and evaluated in-process. Some major problems can be identified. Reliable in-process measurement of tool-wear is the only limitation today for on-line identification of cutting variables. In the use of the various mathematical models which have been devised for tool life, problems are encountered because of the variability in material characteristics; accordingly results with sufficient accuracy cannot be obtained. In addition, a strategy or procedure must be used in connection with whatever model is adopted in order to provide a combination of cutting variables which optimizes productivity. Solution of the described problems is presented in the following steps.

Material properties are usually presented as V-T-diagrams or simply test points, tables or constants for some tool-life relationship, mostly Taylor's.

In other words, there is a relationship between cutting parameters, meaning cutting speed v, tool-life T, and cutting geometry. Cutting speed is calculated from the turned diameter D and rotational speed $\eta$ by v (m/min) = $\pi \cdot D \cdot n$ (3,14, $m$, rpm). Tool wear can be specified by different parameters as, for example, flank wear. In this case, the width of the flank is used as a parameter. Tool-life is then defined at a time in which wear of the tool reaches a predetermined value of the width of the flank used as a criterion. Feed and tool geometry are other parameters directly involved in the cutting process. Any change in these parameters results in change of tool-life when the cutting speed is kept constant. An introduction of the chip equivalent $q$, as a ratio between the total engaged cutting edge length divided by the chip cross-sectional area (before material removal) simplified the relationship between cutting variables in turning, milling, and grinding operations. For example, having constant cutting speed, the tool-life for turning is the same for different combinations of depth of cut ($d$), feed ($s$), nose radius ($r$) and side cutting angle ($k$) if the calculated value of the chip equivalent ($q$) is kept constant and calculated by $$q = \frac{\frac{d - r(1 - \sin k)}{\cos k} + \left(\frac{\pi}{2} - k\right)r + \frac{s}{2}}{d \cdot s}$$

Machinability for turning can then be expressed as a relationship between three variables v, T and q. Considering a graphic representation on log-log graph paper, when tool-life is usually plotted against cutting speed, every continuous curve corresponds to a constant q value which is the third parameter.

The following methods enables use of all this data by converting it into a matrix for more convenient use in later optimization by the adaptive system. The problem arises when new material or material without previous testing is to be machined or when variations in known material are significant and should be respected. For such a purpose, the procedure in connection with the optimization strategy is described later on.

In this first step, the test points are adapted to a tool-life relationship in an analytical form but only with respect to speed. Here any v-T relationship might be used, even the well-known Taylor equation. As it is now generally reconized that tool-life results, plotted on log-log graph paper versus cutting speed, fit downward concave curves better than straight lines, it is better to assume such a kind of relationship. The most simple way to obtain a non-linear relationship is presumably to assume a single polynomial of second degree:

$$\ln v (a_0 + a_1 \cdot \ln T + a_2 \cdot (\ln T)^2$$

where $a_0$, $a$ and $a_2$ are general constants of the polynomial.

By rewriting the equation in the following form it is evident that this is only a modification of the Taylor equation:

$$vT - (a_1 + a_2 \cdot \ln T) = e^{a_0}$$

The three constants are evaluated by the method of least squares. The result from the first step will be a matrix representing the test material containing three columns, one for each constant, and one row for each q-value.

Referring to the formula for evaluation of this chip equivalent q different q-values can be derived tests in which the feed side cutting angle and nose radius are held constant while the depth of cut is changed. Compare FIG. 17, step 1.

The following is an example of how an optimization procedure or strategy can be performed. The strategy is illustrated in FIG. 17, step 2, where each step of the procedure is marked by the subscript $i$ and where $b_0$, $b$ and $b_2$ are general constants of the following polynomial.

Choose a very short tool life as an initial value of T ($T_{min}$) to be sure this is less than optimal T. An initial value of T equal to one minute can be selected. Then, v is calculated for the different q-values. The different points obtained from this calculation are approximated by a single second degree polynomial, valid for definite value of T.

$$\ln V = b_0 + b_1 \cdot \ln q + b_2 \cdot (\ln q)^2$$

Determination of the constants $b_0$, $b_1$ and $b_2$ is performed by the method of least squares and can be presented as an adaptation of previous representation to the new functional relationship between V and q where T is considered as a parameter. This calculation is illustrated in the flow-chart by the block labelled "adapt."

When the b constants have been evaluated by the method of least squares, $q_o$ is calculated from:

$$q_0 = \exp \cdot \frac{1 - b_1}{2 b_2} ,$$

based on the economic criterion $$\frac{dy}{dx} = 1$$

when $y = \lg V$ and $x = \lg q$.

$v_0$ is then obtained from the polynomial above

By subscripted variables $q_0$, $V_0$ is meant the calculated values of the chip equivalent q and cutting speed V which give the best (optimum) productivity for the fixed tool-life when using the mentioned economic criterion.

Productivity p is then calculated and stored. The same way of proceeding is done for another T-value, T = $T_{min}$ + $\Delta$T, and productivities are compared. As long as productivity increases the procedure will continue, and be stopped only when the optimum value of p is reached. (FIG. 17, step 2.)

The identification of material properties is now described.

A tool wear correlated quantity can feasibly be measured in-process. There exists a relationship between time of machining and tool wear, which makes it possible to prognosticate tool-life T. when illustrating the use of the model in a kind of adaptive system, flank wear is assumed to be predominant over crater wear and the width of the flank (VB) is measured. By VB is meant the width of the worn tool tip. In the particular case of flank wear, the tool is considered worn out when the real width VB on the tool reaches the predetermined value used as a criterior and designated as $VB_{max}$. (For example $VB_{max}$ = 0.3 mm). The correspondng time which it takes is related to a tool-life T.

Figure 18:
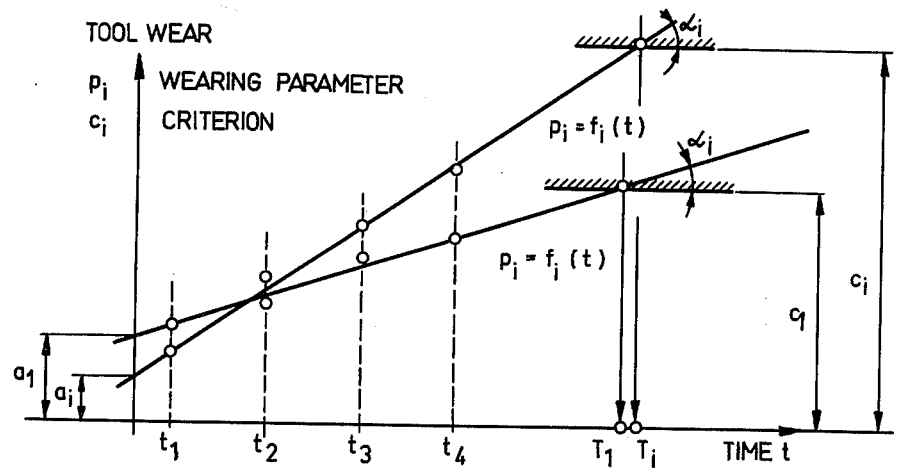
FIG. 18 illustrates an example of a mathematic model for determining tool life.

FIG. 18 illustrates a mathematical method for the determination of tool-life when considering constant machining conditions. The relationship between tool-wear and time is assumed to be a significant description of the machining process. The relationship is approximated by a straight line when wearing parameter is plotted against time. Tool-life is defined as the time in which the tool wear specified by the wear parameter has the same value as the chosen wear criterion.

It means that tool-life is evaluated by extrapolation of the linear approximation of the measured wearing parameter when using statistical methods. Increasing the number of measured wear parameter points gives better accuracy of evaluated tool-life. Because of intermittent measurement of wear parameter, accuracy of tool-life is improved with time. When more wear parameters are used at the same time ($p_i$)

$$p_i = f_i(t) = a_i + k_i \cdot t \text{ where } k_i = \tan\alpha_i$$

When the following expression is satisfied, $$c_i = p_i = a_i + k_i \cdot T_i$$

tool-life is then defined as $$T_i = \frac{c_i - b_i}{k_i}$$

In the above expressions, ($p_i$) represents the wear parameter and ($c_i$) the wear criteria.

For optimization of the machining process the shortest tool life of all the evaluated tool-lives ($T_i$) and correspondng to different wearing parameters ($p_i$) and criterions ($c_i$) is used.

Thus tool-life is then T = min ($T_i$)

When no information about material is available or when variations in material properties are significant, in-process identification of material properties is necessary.

The following relationship is valid:

$$VB = c_0 \cdot t_{b_1} \cdot s_{b_2} \cdot v_{b_3}$$

where $C_0$, $b_1$, $b_2$ and $b_3$ are constants and t designates cutting time. At a certain value of VB ($CVB_{max}$), the tool is considered worn out and the corresponding t constitutes tool life. Hence, by measuring VB, it is feasible to prognosticate T even under conditions when cutting conditions vary.

FIG. 19 illustrates a flow-chart for testing a material by "quick-test" where only three q-values are treated (0,75 $q_r$, $q_r$ and 1,25 $q_r$), hence, the resulting matrix is a 3 ×2 matrix. Subscript r designates recommended values of v and q, respectively. For a definite combination of the tool and the turned material tool producers recommend use of a definite cutting speed and chip equivalent (calculated from recommended depth of cut, feed, etc.) in order to get correspondng tool-life giving the best productivity. As mentioned, changes of the chip equivalent in order to get variations in test points for investigations of the relationship between the cutting variables representing material properties can be conveniently done by changing the feed by ±25% of recommended value. A turning operation under these three different conditions should result in three different tool-lives T which can be evaluated by extrapolation. The selection of the sequence of v and q to be used is executed in such a way that the number of necessary VB measurements will be as few as possible. Execution runs may be carried out according to the following steps as a typical illustration:

Calculate $b_1$ by a series of VB measurements (a minimum of two), or estimate $b_1$ by an experience value or simply put $b_1$ = 0.75.

Calculate $b_3$. This should be feasible by two VB-measurements at two different v-values and at a fixed q-value, based on the experience that $b_2$ is independent of v. Then $a_1$, the slope of the straight vT-line for a certain q, is obtained by the quotient between $b_1$ and $b_3$. Hence, the $a_1$-column in the matrix is determined.

To obtain the $a_o$ -column, T-measurements at the remaining two q-values of interest are accomplished by another two VB measurements.

Calculate $a_0$ from: $a_0 = \ln v - a_1 \cdot \ln T$

Evaluate $V_o$, $q_o$ by an optimizing strategy, for example, by the method described above in connection with FIG. 17.

When the difference between the expected value of tool-life T and the real value based on on-line measurements are greater than a certain difference $\Delta T$, then new calibration of the turned material is performed according to previously described procedure, as already described in connection with FIG. 19.

With reference to FIGS. 20, 21, 22 and 23, an embodiment of an adaptive system according to the invention is described in detail.

Figure 20:
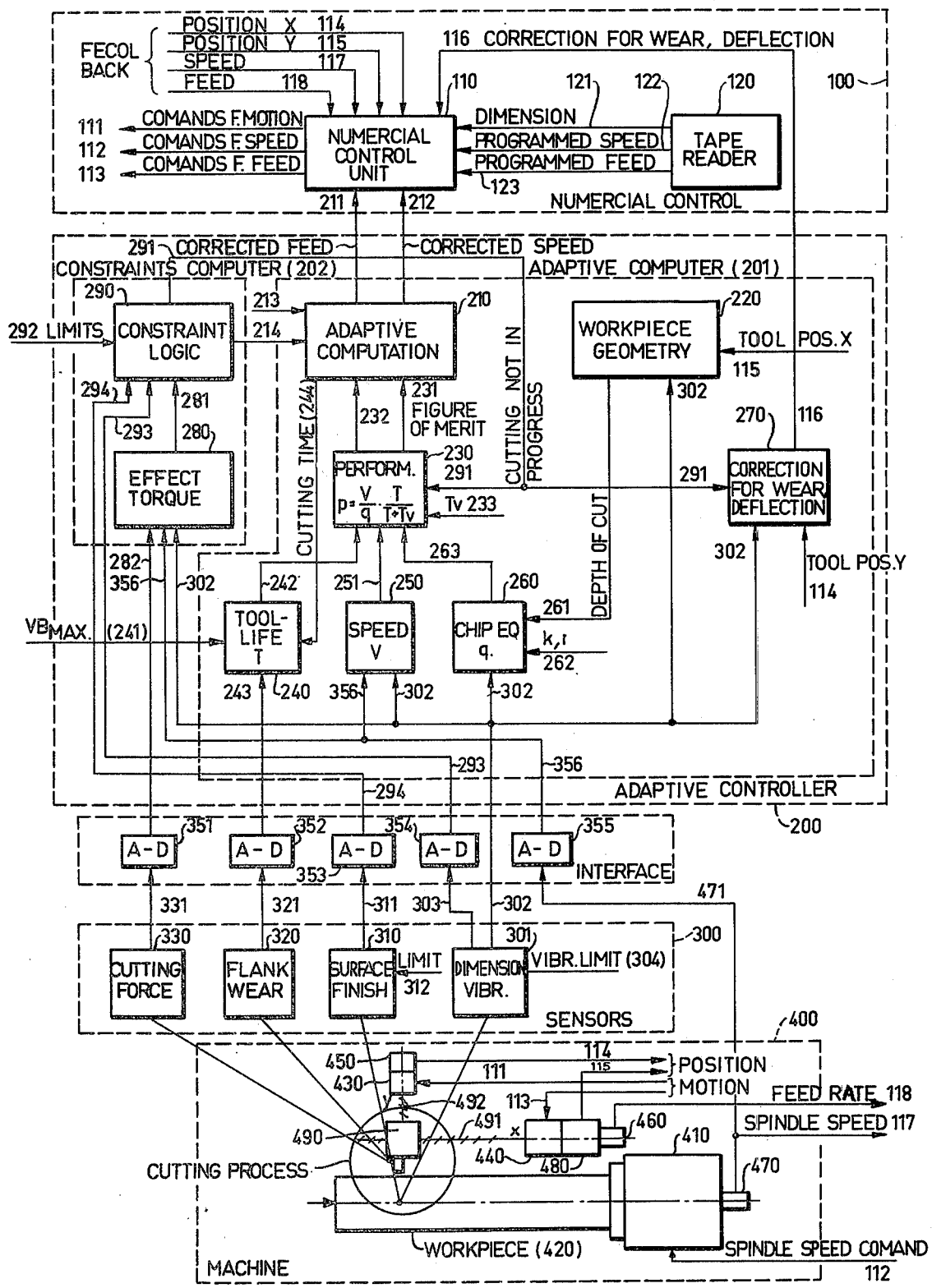

Adaptive control of the turning operations employs a conventional numerically controlled lathe indicated by block 100 in FIG. 20. The system receives the programmed information by decoding a punched tape by a tape reader 120, generating the electrical signals as a representation for programmed position of the tool, speed and feed. Lines 121, 122, and 123 designate the signals entered into the numerical control unit 110. The numerical control unit generates the motion signals transmitted by line 111 to motion servo drive 430 for radial displacement of the tool holder; by line 113, commands for feed applied to the servo drive 440; and spindle speed is commanded by line 112 to the spindle motor 410. Positional feed-back transmits the positional signals generated by conventional optical rotary transducers 450 and 480 into the numerical control unit on lines 114 and 115. Position is measured by accurate measurement of the number of revolutions of accurate ballscrews 491, 492, and signals in the form of electrical pulses are counted by an up-down counter in a numerical control unit 110. Numerical control unit 110 is supplied by a manual correction for tool-wear which can be measured off-line. That correction is replaced by signals automatically correcting tool position and entered into the system on line 116 from the adaptive computer 201.

The adaptive controller 200, consisting of constraints minicomputer 202 and adaptive computer 201, makes possible modification of the programmed information by correction for speed on line 212 and correction for feed on line 211, transmitting the signals, which are digital in nature, into the numerical control unit. Adaptive computer is a digital process computer and different programs are labeled as blocks. All signals included in adaptive controller 200 are digital in nature. The adaptive controller performs optimization of cutting conditions as well as identification of material properties by previously described procedures stored in adaptive computer 201 in block 210 labelled adaptive computation. As a figure of merit, productivity is used which is calculated in block 230 and entered into the adaptive block 210 by line 231. Line 232 illustrates the transmission of real values of cutting speed, tool-life and chip equivalent. Tv represents the cost parameter entered manually in digital form into the adaptive computer.

In-process measurement of cutting speed V, tool-life T, and chip equivalent $q$ is a prerequisite for calculation of the real value of productivity. Signals from the proper sensors are converted into the digital form and entered into the adaptive computer. Blocks 240, 250 and 260 illustrate different calculations performed by the adaptive computer. Computation or evaluation of tool-life T is based on used wear criterion $VB_{max}$ entered into the computer manually in a digital form on line 241, which function has been described previously as well as the program package for tool-life evaluation. Real cutting time is supplied by line 244 from the computer, and computed tool-life is on line 242. The signal from the sensor for flank wear is converted into a digital form by analog-digital converter 352 and entered into the computer on line 243. Cutting speed is calculated as spindle speed multiplied by workpiece radius, and the signals in digital form are entered into the system on lines 302 (workpiece dimension) and 356 (spindle speed). Calculated speed enters the calculation of figure of merit (productivity) by connection 251. The last variable which is necessary for optimization is chip equivalent $q$ calculated by program block 260, supplied with information about real workpiece diameter (302), manually entered constants $k$ (side cutting angle), and $r$ (nose radius), in digital form (input 262). Depth of cut enters the computation of chip equivalent on line 261. The geometry of the workpiece based on previous measurement by a measuring unit is stored in the block labeled workpiece geometry and designated 220. Depth of cut is calculated as a difference between workpiece diameter before (stored) and after (measured) cut. Block 220 is also supplied with information about the axial position of the tool input 115 (provided by the measuring unit) in order to compare the stored and real data. As mentioned, the manual correction for tool wear in NC numerical control system is replaced by automatic correction for the difference between comanded and actual turned diameter because of the tool wear, thermal changes in machine, and deflection of the workpiece. The correction is made by block 270 having information about real workpiece diameter on line 302 and about the position of the tool holder on input 114. Calculation is interrupted by a cutting-not-in-progress signal on line 291. This correction enters into the numerical control unit on line 116. The signals are digital in nature.

Optimization of the cutting parameter, and thereby modification of the programmed commands may result in correction of speed on line 212 and/or of feed on line 211 however, such correction may be affected in the event that the correction should bring about a violation of the constraints. Limiting parameters as maximum and minimum feed, maximum spindle power, and torque are entered into the constraint computer manually on input 292 in digital form. Constants for corresponding subroutines in the adaptive computer, as, for example, $\Delta$ feed, $\Delta$ speed, for changes in cutting data, and entered into the computer on line 213, also manually. At regular intervals, the constraint logic 290 checks state of all limited parameters. An input 281 representing real torque, power and force; an input on line 293 representing the binary-coded existence of vibration; and an input on line 294 representing binary-coded existence of violation of surface finish limit; are all fed to the constraint logic. Interruption in cutting, indicated by zero force, results in a cutting-not-in-progress signal on output 291 which interrupts the computation taking place in block 230. Signals representing respectively violation-of-limit-for-surface-finish, and vibration, are transmitted by line 214 in digital form to the adaptive computer 210, and this results in a reduction of feed by parameter an amount $\Delta$ feed, stored in block 210. Values of power and torque are computed by the program block 280 in constraint computer 202 and transferred into the constraint logic on line 281.

Calculations accordingly involve simple relationships of torque (i.e. tangential cutting force multiplied by the radius) and power (i.e. torque times rotational spindle speed). Violation of the power constraint results in a speed decrease by an amount Δ speed which is entered into the adaptive computer on input 213. Block 280 designates the carrying out of a program for the above-mentioned computations. Information as to workpiece dimension is provided on line 302, cutting force on line 282, and rotational speed of the workpiece of line 356, all signals being in digital form.

Figure 21:
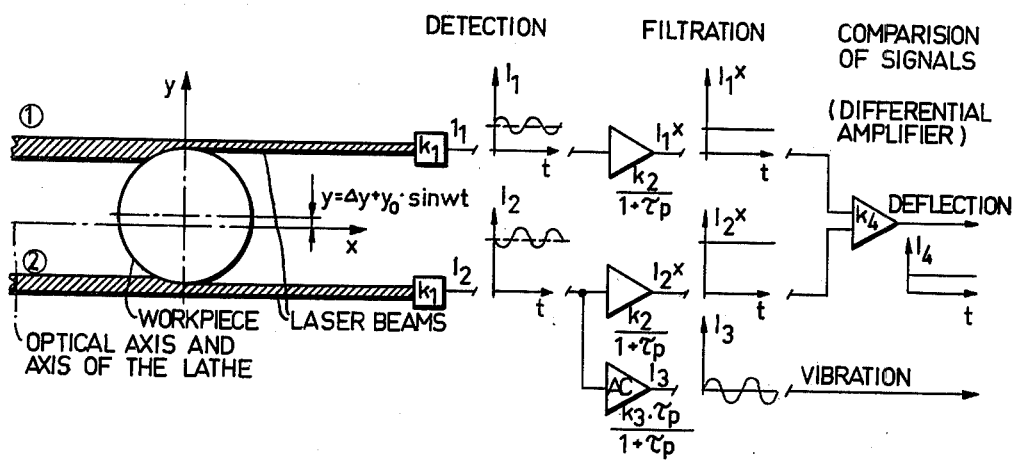
FIGS. 20 to 23, inclusive, illustrate an adaptive system for a numerically controlled lathe.

All variables involved in the optimization process must be measured in-process. Considering the lathe 400 two categories of parameters or variables can be discussed. The first category comprised the variables referred to in a numerical control system comprise spindle speed and position of the tool-holder 490. The second category comprises parameters closely connected with tool-workpiece interface such as cutting force, tool wear, workpiece dimension, vibration, and surface finish sensed by sensors 300. Spindle speed of the main drive 410 is measured by tacho-generator 470, and an electrical DC signal is entered into the numerical control unit by line 117 and by line 471 into a analog-digital converter 355 converting the signal into digital form on line 356. Measurement of feed rate by a tacho-generator 460, with a DC signal on line 118 entered into the numerical control unit, enables calculation and control of feed since feed rate = feed times spindle rotational speed. Position of the tool is controlled by two servomotors 430 and 440 coupled with two optical rotary transducers 450 and 480 supplying the numerical control unit with the positional information on lines 114 and 115 as mentioned before. The radial position of the tool-holder is entered into the adaptive computer in block 220 by connection 115 and into the block 270 on line 114 in order to effect a comparison between stored or commanded and real data. Measuring units 300 for tool-workpiece interface and directly connected with adaptive controller 200. The dimensions and vibrations of workpiece 420 are identified by unit 301 as previously described. The signals corresponding to the workpiece vibration and deflection are schematically illustrated in FIG. 21.

The following mathematical relationships are valid:
$y$ = position of the centre of the workpiece
$\Delta y$ = static deflection of the workpiece
$f$ = frequency of vibration
$y$ = amplitude of vibration
$p^0$ = Laplace operator Assuming linear characteristics of detection ($I = k \cdot y$), signals $I_1$ and $I_2$ can be expressed as $$I_1 = I_o - k_1 \cdot y = I_o - k_1 \cdot \Delta y - k_1 \cdot y_o \cdot \sin\omega t$$
$$I_2 = I_o + k_1 \cdot y = I_o + k_1 \cdot \Delta y + k_1 \cdot y_o \cdot \sin\omega t,$$

where $I_0 = I_1 = I_2$ when $\Delta y = 0$ and $f = 0$.

VIBRATION:

AC amplification of the signal $I_2$ give a signal proportional to workpiece vibration $$I_3 = k_3 \cdot k_1 \cdot y_o \cdot \sin\omega t$$

DEFLECTION:

Low-pass filtration of the signal $I_1$ and $I_2$ removes the periodic part of the signals. The difference between the signals is then proportional to the workpiece deflection in the y-direction.

$$I^x = k_4(I_2{}^x - I_1{}^x) = 2k_1 k_2 k_4 \cdot \Delta y$$

The limit for vibration, referring again to FIG. 20, is entered into the system manually by a potentiometer 304. An AC (alternating current) electrical signal, corresponding to measured vibration, is converted to DC (direct current) voltage leval and compared with the reference voltage from the potentiometer. If the limit is exceeded, a DC electrical signal on line 303 is converted into digital form by binary coding in the analog-digital converter 354. This signal is then entered into the adaptive controller on line 293 and processed by constraint logic 290 which is a programmed part of the constraints computer 202. The workpiece dimension is in a digital form, binary coded on line 302. The position of the laser beams, measuring the workpiece diameter, is measured by use of an accurate ballscrew coupled with rotary transducer and up-down counter. The state the counter is a binary coded value of workpiece diameter. Tool wear measurement, such as flank wear, is determined by the unit 320. An electrical DC signal proportional to the width of the worn flank is transmitted by line 321 to the analog-digital which binary-codes the signal. By line 243, a digital signal representing flank wear is entered into the adaptive computer. Only tangential cutting force is measured by a conventional measuring device 330 mounted on the tool-holder 490. A DC electrical signal proportional to the tangential cutting force on line 331 is converted by binary coding in an analog-digital converter 351 into a digital form and so, by line 282, entered into the constraint computer. The quality of the workpiece is checked by a laser beam detecting the surface finish, unit 310.

Figure 22:
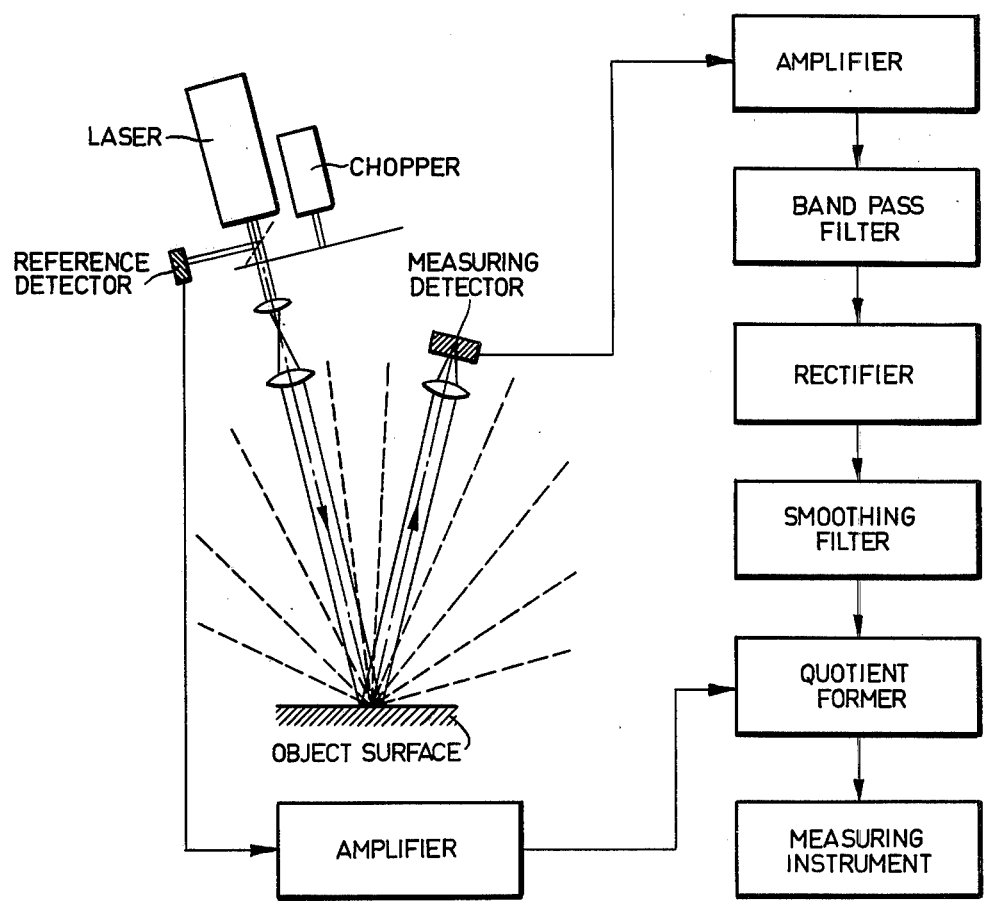

FIG. 22 illustrates the function of an embodiment of a laser surface roughness instrument, known per se, and indicated on FIG. 20 with the block labelled 310. The instrument utilizes parallelism and intensity of laserlight. The beam is directed towards the surface at an angle of incidence of about, for example, 5 degrees to the normal of the air blown surface, illuminating about 4 mm². The intensity of the directly reflected light is measured by a detector that can be situated at a distance of up to 1 m from the surface.

Figure 23:
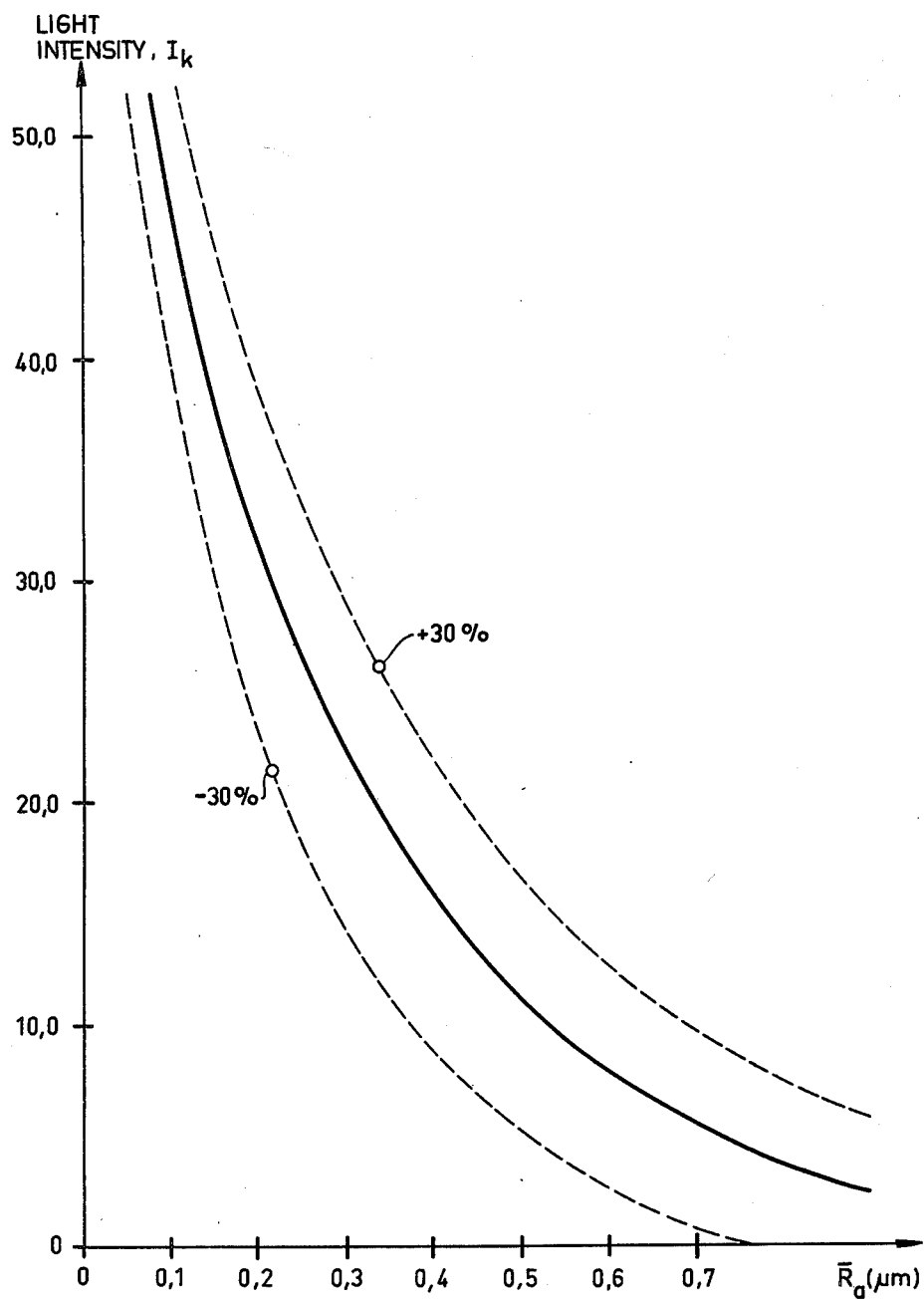

FIG. 23, finally, illustrates the relationship between measured reflected light intensity and surface finish quality $\bar{R}_a$. By measuring $\bar{R}_a$, it has been found experimentally that there is a correlation between reflected light intensity and $\bar{R}_a$ as seen on FIG. 23, provided corrections for the material absorbtion coefficient and the type of machining operation are taken into account.

The material absorbtion coefficient could be eliminated by measuring the light intensity from the surface with an objective that has two opening angles, giving the measuring equipment two light values. The quotient of the two values is independent of the absorbtion coefficient.

Now, referring back to FIG. 20, an AC electrical signal corresponding to measured surface is converted to DC voltage which is compared with desired surface quality. This limit is entered into the device manually by a potentiometer 312 providing a reference voltage. Comparison is performed by a differential amplifier and when the limit is exceeded, a DC signal on output 311 is then binary coded by an analog-digital converter 353. Violation of the constraint is then transmitted by line 294 into the constraint logic 290.

A significant feature of this invention, therefore, is the manner in which the tool life and productivity projections can be periodically confirmed by actual measurement of tool wear. In the claims, this measurement process is referred to by terms such as in-process or measuring during a machining operation. Of course, we cannot perform a measurement simultaneous with active machining. For measurement of tool life, the tool must be disengaged from the workpiece and withdrawn to a measuring location. The tool, of course, remains in the tool holder and, since the measurement is automatically effected, it consumes a very short time interval. Therefore, by these terms we mean that measurements are made in the course of machining, that is, after machining has begun and before it is completed. Thus, we do not necessarily, and often do not, complete a workpiece before a measurement is effected.

What we claim is:

1. A method of adaptive control of cutting machine operations to optimize the productivity of cutting machine means including at least one cutting tool and having controllable cutting parameters affecting its cutting tool comprising the steps of:
   a. selecting a first set of cutting parameters,
   b. performing a machining operation using said first set of cutting parameters,
   c. during said machining operation measuring a plurality of times the magnitude of at least one wear-related parameter of the cutting tool,
   d. comparing the successive measurements of said at least one wear parameter,
   e. calculating the tool life by projecting, based on said comparison step, when said wear parameter will reach a predetermined limiting value,
   f. calculating productivity based on said first set of cutting prameters and the tool life calculated in said tool life calculating step,
   g. optimizing productivity by selecting further sets of said cutting parameters, and calculating for each set the corresponding tool life, and the productivity resulting from said further sets of cutting parameters and said corresponding tool life,
   h. selecting from the optimized productivity value the desired set of cutting parameters.

2. The method of claim 1 wherein each of said sets of cutting parameters includes a selected parameter for cutting speed and a selected parameter for chip equivalent.

3. The method of claim 2 wherein said parameter chip equivalent is equal to the ratio of cutting edge length to the cutting depth multiplied by the feed rate.

4. The method of claim 3 in which the cutting edge length is calculated from the following:

$$\text{cutting edge length} = \frac{d - r(1 - \sin k)}{\cos k} + \left(\frac{\pi}{2} - k\right)r + \frac{s}{2}$$

wherein $d$ is the depth of cut, $r$ is nose radius, $s$ is feed rate and $k$ is side cutting angle.

5. The method of claim 1 wherein said measuring steps employ electromagnetic radiation.

6. The method of claim 5 wherein said electromagnetic radiation is provided by a light source.

7. The method of claim 6 wherein said light source comprises a laser.

8. The method of claim 7 wherein said laser light source produces a laser beam with a rectangular cross section.

9. The method of claim 1 wherein productivity is calculated as follows:

$$\frac{v}{q} \cdot \frac{T}{T + T_v}$$

wherein $v$ is cutting speed, $q$ is chip equivalent, T is tool life and $T_v$ is a tool cost factor, converted into machine time.

10. The method of claim 1 which further includes the steps of:
    storing a predetermined limiting value of said at least one tool wear parameter,
    at times comparing said measured tool wear parameter with the stored limiting value of said parameter,
    and terminating the cutting operation when said comparison indicates that tool wear has reached a level corresponding to said limiting value.

11. The method of claim 1 which further includes the steps of:
    monitoring during said machine operation at least one parameter responsive to the action of the cutting tool on the workpiece,
    storing a predetermined value of said at least one parameter,
    comparing the monitored value of said at least one parameter with the stored value,
    and modifying the cutting operation when the monitored value exceeds the stored predetermined value.

12. The method of claim 11 wherein said at least one parameter comprises one of the parameters of workpiece vibration, workpiece deflection, workpiece dimension, and surface finish.

13. The method of claim 11 wherein said at last one parameter comprises the cutting force of the cutting tool on the workpiece.

14. A method of adaptive control of cutting machine operations for a cutting machine including at least one cutting tool and having controllable cutting parameters affecting its cutting tool comprising the steps of:
    a. storing for subsequent checking a predetermined relationship among said cutting parameters and tool lives based on said cutting parameters,
    b. selecting a first set of cutting parameters,
    c. performing a machining operation using said first set of cutting parameters,
    d. during said machining operation measuring a plurality of times the magnitude of at least one wear-related parameter of the cutting tool,
    e. comparing the successive measurements of said at least one wear parameter,
    f. calculating the tool life by projecting, based on said comparison effected in step (3) when said wear parameter will reach a predetermined limiting value,
    g. comparing the tool life as calculated in step (f) with the tool life obtained in accordance with the predetermined relationship obtained in accordance with step (a),
    h. carrying out the cutting operation using the cutting parameters based upon the predetermined relationship obtained in accordance with step (a) only provided that the tool life calculated in accordance with step (f) comes within a predetermined range of the tool life as provided by said predetermined relationship.

15. The method of claim 14 wherein each of said sets of cutting parameters includes a selected parameter for cutting speed and a cutting parameter for chip equivalent.

16. The method of claim 15 wherein said parameter chip equivalent is equal to the ratio of cutting edge length to the cutting depth times the feed rate.

17. The method of claim 16 in which the cutting edge length is calculated from the following:

$$\text{cutting edge length} = \frac{d - r(1 - \sin k)}{\cos k} + \left(\frac{\pi}{2} - k\right)r + \frac{s}{2}$$

wherein $d$ is the depth of cut, $r$ is nose radius, $s$ is feed rate and $K$ is side cutting angle.

18. The method of claim 14 wherein said measuring steps employ electromagnetic radiation.

19. The method of claim 18 wherein said electromagnetic radiation is provided by a light source.

20. The method of claim 19 wherein said light source comprises a laser.

21. The method of claim 20 wherein said laser light source produces a laser beam with a rectangular cross section.

22. The method of claim 14 wherein productivity is calculated as follows:

$$\frac{v}{q} \cdot \frac{T}{T + T_v}$$

wherein $v$ is cutting speed, $q$ is chip equivalent, $T$ is tool life and $T_v$ is a factor tool cost, converted into machine time.

23. The method of claim 14 which further includes the steps of:
storing a predetermined limiting value of said at least one tool wear parameter,
at times comparing said measured tool wear parameter with the stored limiting value of said parameter,
and terminating the cutting operation when said comparism indicates that tool wear has reached a level corresponding to said limiting value.

24. The method of claim 14 which further includes the steps of:
monitoring during said machining operation at least one parameter responsive to the action of the cutting tool on the workpiece,
storing a predetermined value of said at least one parameter,
comparing the monitored value of said at least one parameter with the stored value,
and modifying the cutting operation when the monitored value exceeds the stored predetermined value.

25. The method of claim 24 wherein said at least one parameter comprises one of the parameters of workpiece vibration, workpiece deflection, workpiece dimension, and surface finish.

26. The method of claim 24 wherein said at least one parameter comprises the cutting force of the cutting tool on the workpiece.

27. The method of claim 14 wherein the predetermined relationship stored in accordance with step (a) is modified if the tool life calculated in accordance with step (f) does not come within a predetermined range of the tool life as provided by the originally stored predetermined relationship.

28. A method of adaptive control of cutting machine operations by in-process measurement for optimizing the productivity of the machine operation with cutting machine means having controllable machining parameters affecting a cutting tool, comprising the steps of:
selecting a plurality of sets of machining parameters, and performing a machining operation with each said set of parameters,
measuring a plurality of times at least one wear related parameter of the cutting tool as a result of each of said machining operations,
projecting, based on the measured changes in said at least one wear related parameter, the machining life of the cutting tool until said wear related parameter exceeds a predetermined maximum based on one of said sets of machining operation parameters, and
optimizing the productivity of said machining operations by using different ones of said sets of machining parameters.

* * * * *